(12) United States Patent
Bock et al.

(10) Patent No.: US 10,029,403 B2
(45) Date of Patent: Jul. 24, 2018

(54) METHOD AND DEVICE FOR PRODUCING PREFORMS WITH SPECIAL GEOMETRIES

(71) Applicant: Netstal Maschinen AG, Naefels (CH)

(72) Inventors: Stefan Bock, Glarus (CH); Britta Scheunemann, Glarus (CH)

(73) Assignee: NETSTAL-MASCHINEN AG, Naefels (CH)

( * ) Notice: Subject to any disclaimer, the term of this patent is extended or adjusted under 35 U.S.C. 154(b) by 69 days.

(21) Appl. No.: 15/006,365

(22) Filed: Jan. 26, 2016

(65) Prior Publication Data

US 2016/0136862 A1 May 19, 2016

Related U.S. Application Data

(63) Continuation of application No. 13/380,926, filed as application No. PCT/EP2010/058319 on Jun. 14, 2010, now Pat. No. 9,272,457.

(30) Foreign Application Priority Data

Jun. 27, 2009 (DE) .................... 10 2009 030 762

(51) Int. Cl.
  *B29C 39/02* (2006.01)
  *B29C 49/06* (2006.01)
  *B29C 45/72* (2006.01)
  *B29C 49/18* (2006.01)
  *B29B 11/08* (2006.01)
  (Continued)

(52) U.S. Cl.
  CPC .............. *B29C 49/06* (2013.01); *B29B 11/08* (2013.01); *B29C 45/261* (2013.01); *B29C 45/4225* (2013.01); *B29C 45/7207* (2013.01); *B29C 49/18* (2013.01); *B29C 49/48* (2013.01); *B29C 49/4205* (2013.01); *B29C 49/6427* (2013.01);
  (Continued)

(58) Field of Classification Search
  CPC .............. B29C 45/4225; B29C 49/061; B29C 49/4205; B29C 2045/7221; B29B 11/08
  See application file for complete search history.

(56) References Cited

U.S. PATENT DOCUMENTS 3,944,643 A * 3/1976 Sato .................... B29C 49/0005
  264/532
4,313,905 A * 2/1982 Hafele ................ B29C 45/7207
  264/532
(Continued)

FOREIGN PATENT DOCUMENTS

EP 0 241 040 A1 10/1987
EP 1 086 799 A1 3/2001
(Continued)

*Primary Examiner* — Stella K Yi
(74) *Attorney, Agent, or Firm* — Henry M Feiereisen LLC

(57) ABSTRACT

Preforms with a neck region and a preform body and having an enlarged geometry in comparison with the cavity of the injection mold are produced by injecting a polymer melt into the mold with a geometry of the cavity in the mold such that the radial extent of an inner space in the preform body thereby produced is not greater than the radial extent of the inner space in the neck region, the preforms are removed from the open mold by a removal gripper, and the preforms in the removal gripper are inflated using positive pressure such that the geometry of the inflated preform body is larger than the cavity in the injection mold.

16 Claims, 3 Drawing Sheets

(51) Int. Cl.

| | | |
|---|---|---|
| *B29C 45/26* | (2006.01) | |
| *B29C 45/42* | (2006.01) | |
| *B29C 49/48* | (2006.01) | |
| B29C 49/42 | (2006.01) | |
| B29C 49/64 | (2006.01) | |
| B29K 105/00 | (2006.01) | |
| B29L 31/00 | (2006.01) | |

(52) U.S. Cl.
CPC ............... *B29C 2045/7214* (2013.01); *B29K 2105/258* (2013.01); *B29L 2031/7158* (2013.01)

(56) References Cited

U.S. PATENT DOCUMENTS

| | | | |
|---|---|---|---|
| 4,357,296 | A | 11/1982 | Hafels |
| 6,223,541 | B1 | 5/2001 | Farrag |
| 7,648,662 | B2 | 1/2010 | Pesavento |
| 2005/0161866 | A1 | 7/2005 | Batlaw et al. |
| 2006/0222729 | A1 | 10/2006 | Larsen |

FOREIGN PATENT DOCUMENTS

| | | |
|---|---|---|
| EP | 1 488 911 A1 | 12/2004 |
| EP | 2 161 116 A1 | 3/2010 |
| JP | 04062028 A | 2/1992 |
| JP | 04126206 A | 4/1992 |
| WO | WO 00/24562 | 5/2000 |
| WO | WO 03/086728 A1 | 10/2003 |
| WO | WO 2004/026560 A1 | 4/2004 |
| WO | WO 2008/041186 A2 | 4/2008 |

\* cited by examiner

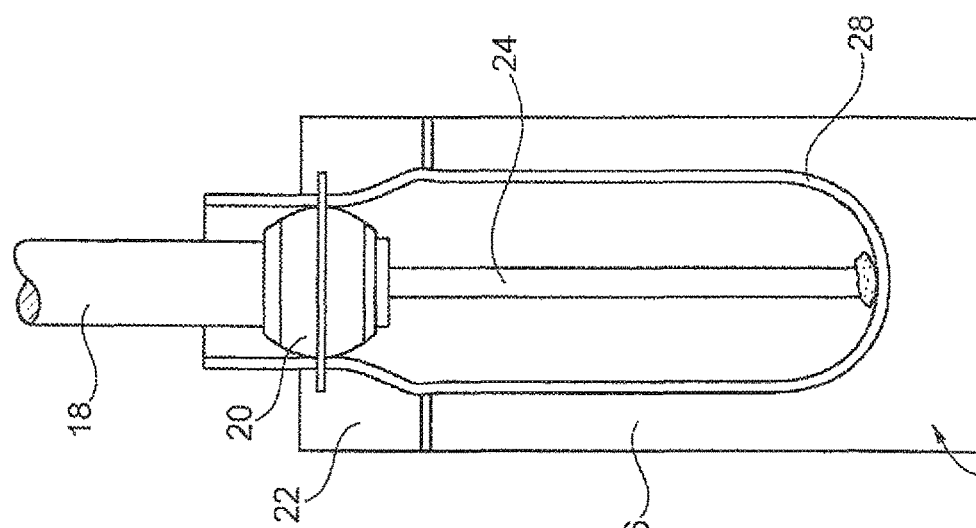
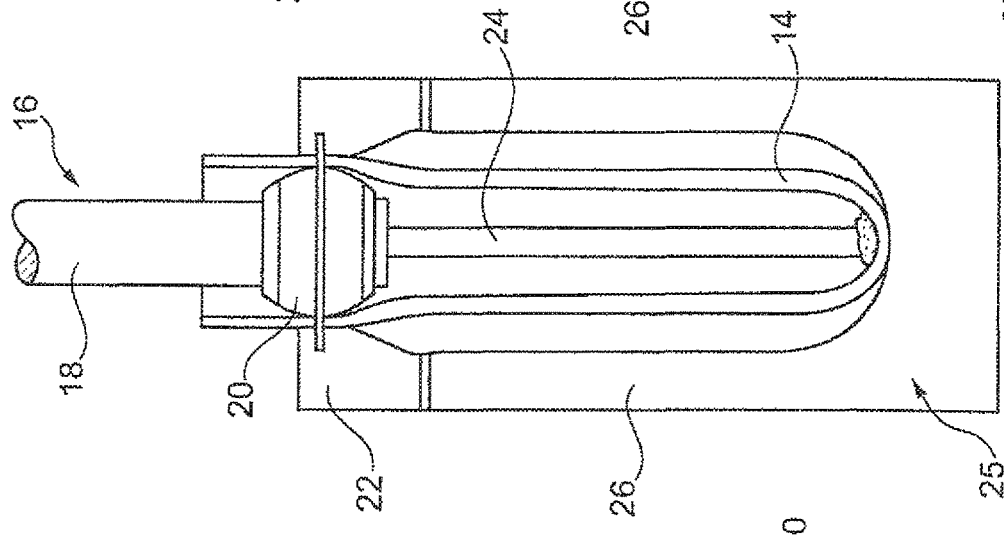
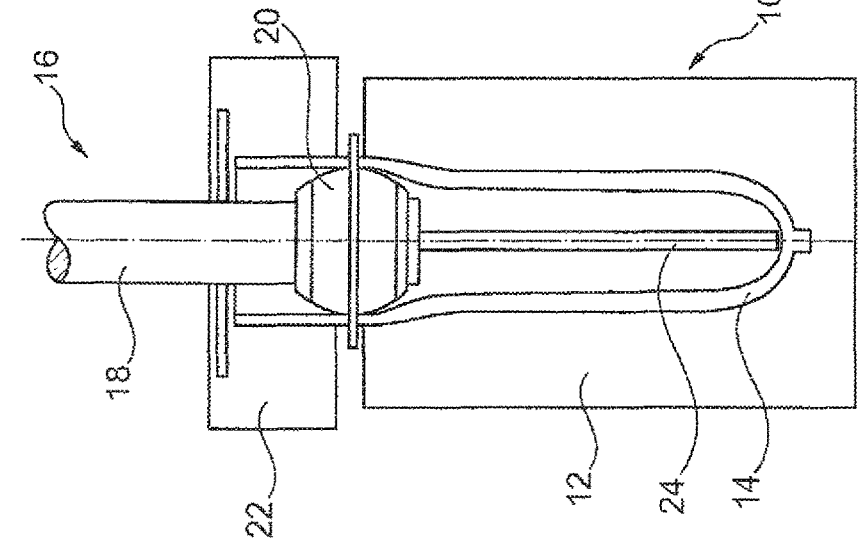

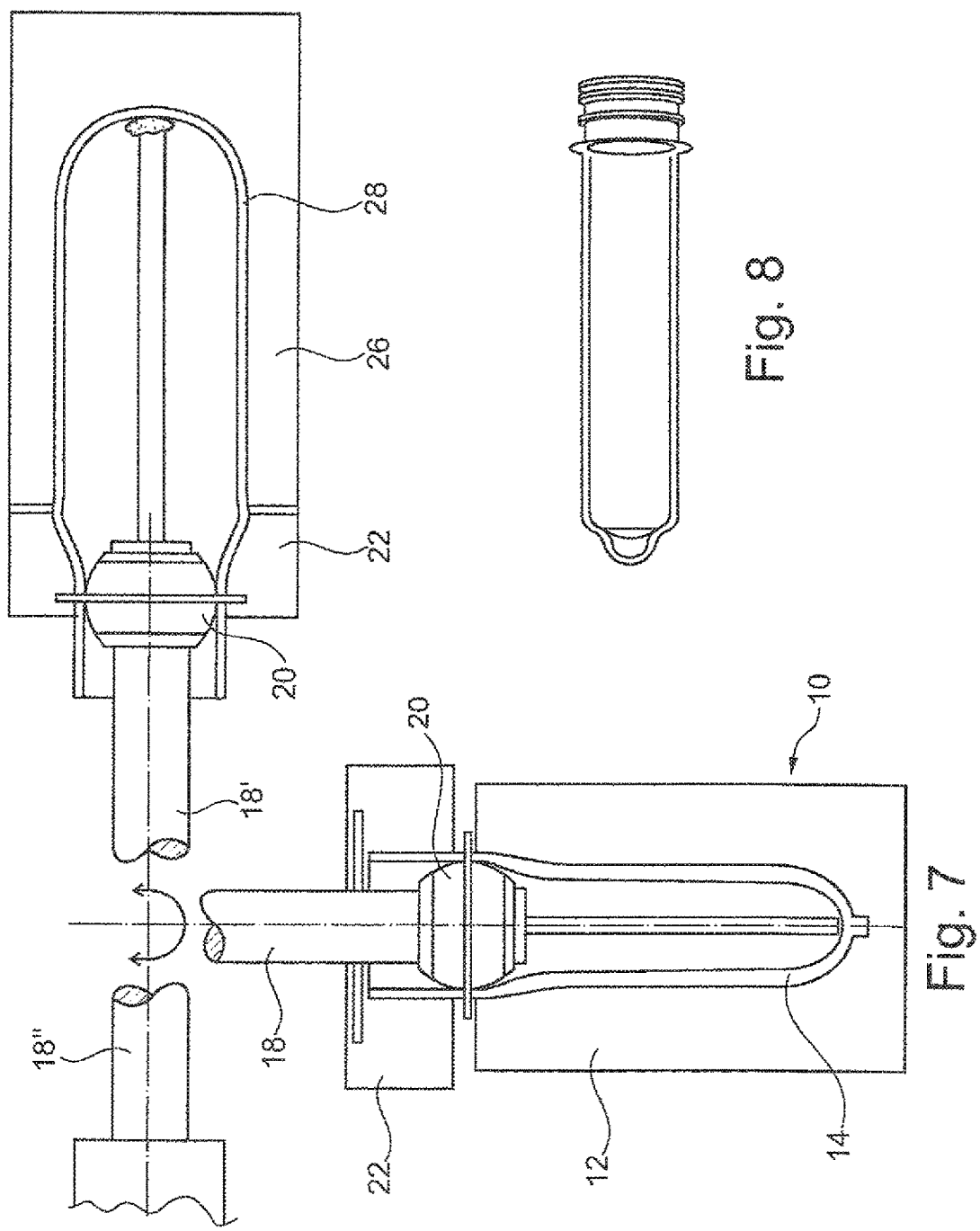

//  METHOD AND DEVICE FOR PRODUCING PREFORMS WITH SPECIAL GEOMETRIES

CROSS-REFERENCES TO RELATED APPLICATIONS

This application is a continuation of prior filed copending U.S. application Ser. No. 13/380,926, filed Mar. 16, 2012, the priority of which is hereby claimed under 35 U.S.C. § 120 and which is the U.S. National Stage of International Application No. PCT/EP2010/058319, filed Jun. 14, 2010, which designated the United States and has been published as International Publication No. WO 2010/149522 and which claims the priority of German Patent Application, Serial No. 10 2009 030 762.1, filed Jun. 27, 2009, pursuant to 35 U.S.C. 119(a)-(d).

The contents of U.S. application Ser. No. 13/380,926, International Application No. PCT/EP2010/058319, and German Patent Application, Serial No. 10 2009 030 762.1 are incorporated herein by reference in their entireties as if fully set forth herein.

BACKGROUND OF THE INVENTION

The present invention relates to a method and a device for producing preforms with a special geometry, which is enlarged in comparison with the cavity in the injection mould.

In the production of plastic bottles, it is usual to firstly produce a so-called preform, which in a subsequent step is inflated into a finished plastic bottle by a blow moulding process.

In the preform production, conventionally, firstly a plastic material (e.g. plastic granulate) is melted and is introduced into the cavities of a closed injection mould. Such an injection mould generally has a plurality of identical cavities which are also designated as impressions.

In order to form the preform geometry according to FIG. 1, the impressions comprise in addition to a so-called neck region, a cavity recess, into which a core projects. The core defines the inner space of the preform, the cavity recess together with the neck region the outer contour of the preform—together, they therefore establish the geometry of the preform.

After the injecting of the polymer melt into the multiple cavities, a first cooling process is carried out, in order to achieve a sufficient rigidity for the preforms, which makes an opening of the injection mould possible. After the opening of the injection mould, the produced batch of preforms is conventionally removed from the mould with a removal gripper, wherein for this in known methods each preform is transferred into an associated, mostly cooled removal sleeve of a removal gripper.

After the removal of the preforms from the injection mould, it is known to transfer the preforms by means of a transfer gripper out from the removal gripper into a further post-cooling device. After a sufficient cooling of the preforms in this post-cooling device, they are then either conveyed directly to a blow moulding installation or are packed into a carton for storage and transportation.

For a high degree of efficiency of the installation, it is important to keep the cycle time as short as possible, in order to be able to produce as many preforms as possible. However, conflicting with a further shortening of the cycle time is that fact that a considerable amount of heat must be respectively dissipated from the preforms, in order to bring them effectively to an acceptable temperature level for packing.

This takes place on the one hand already in the injection mould itself, where a very aggressive cooling is provided both via the core and also via the cavity device. The removal sleeves of the removal gripper are also generally (water) cooled.

In addition, under the brand name "Calitec" of the company Netstal, a method has been introduced, in which the inner space of the preforms, which are situated in the removal gripper, are placed under pressure, so that they position themselves with their outer wall intimately against the wall of the removal gripper and a particularly good cooling and also a recalibration is ensured. For this purpose, the transfer pins of the transfer gripper have devices for sealing the inner space of the preforms and for introducing a fluid, for example of air.

In the sequence described above, it is usual to generate a preform with a design, as is illustrated in FIG. 1. The type of design generally results from the fact that on the removal of the preforms from the injection mould, on the one hand the core must be drawn out from the inner space of the preform, and on the other hand the preform itself must be removed from the cavity. These two procedures would not be able to be directly and readily carried out in a preform geometry as is illustrated in FIG. 2. At least a core constructed in one piece could generally not be drawn out from the inner space.

On the other hand, preform geometries as are shown in FIGS. 2, 3 and 8 have some advantages, which will be explained further below.

SUMMARY OF THE INVENTION

For this reason, it is an object of the present invention to indicate a method and a device by which preforms with a special geometry, e.g. an undercut—in particular in the shoulder region—or with a widening in the base region can be produced, wherein the finished preform has a neck region with a thread or a different closure device and a preform body with a larger or respectively widened preform body in comparison with the cavity in the injection mould adjoins the neck region.

According to one aspect of the invention, the object is solved by a method for producing preforms with a special geometry, wherein the finished preform has a neck region with a thread or a closure device and a preform body, which adjoins the neck region and has an altered, enlarged geometry in comparison with the cavity of the injection mould, wherein preforms are produced by injecting a polymer melt into an injection mould, in which the geometries of the impressions forming the cavity in the mould are designed in such a way that the radial extent of the inner space in the preform body thereby produced is not greater than the radial extent of the inner space in the neck region, the injection mould is opened after a first cooling step, the preforms are removed from the open mould with a removal gripper, transfer pins of a transfer gripper are introduced into the associated inner space of a preform and the preforms are removed from the removal gripper by means of the transfer gripper and are transferred into a post-cooling device, wherein the preforms are either inflated in the removal gripper and/or in the post-cooling device using positive pressure with respect to the cavity situated in the injection mould and with the wall thereof are placed against the walls of an enlarged cavity in the removal gripper or the post-cooling device.

According to another aspect of the invention, the object is solved by a device for producing a preform geometry with an undercut, wherein the finished preform has a neck region with a thread or a closure device and a preform body, which adjoins the neck region and has an altered, enlarged geometry in comparison with the cavity of the injection mould, wherein an injection mould is provided with a number of impressions for the formation of preform geometries, wherein the individual impression geometries are configured in their cavity such that the radial extent of the free inner space in the preform body is not greater than the radial extent of the free inner space in the neck region, a plasticizing and injecting device is provided, in order to melt a plastic material and to introduce it into the cavity of the closed injection mould, a removal gripper is provided with a number of removal sleeves, which are constructed respectively to receive preforms which are formed in the injection mould, a transfer gripper is provided with a number of transfer pins corresponding to the number of removal sleeves, which pins are respectively able to be introduced into an associated preform, a post-cooling device is provided with a number of cavities, the transfer gripper is constructed for transferring a batch of preforms from the removal gripper to the post-cooling device and the transfer pins of the transfer gripper have a sealing device for sealing a preform inner space and a fluid production device for the introduction of fluid into the preform inner space, wherein the cavities of the removal sleeves of the removal gripper and/or the cavities of the post-cooling device are enlarged radially and/or axially in comparison with the cavity realized in the injection mould.

A central idea of the invention is to be seen in that the preforms which are removed from the mould are firstly conditioned with regard to temperature in the removal device, i.e. are brought to a particular temperature level, which on the one hand already significantly reduces the risk of crystallization, but on the other hand makes possible a further forming of the preform. In contrast to the systems hitherto, for a subsequent inflation process if applicable cooling is not carried out as intensively as possible, in order to obtain a preform which is already hardened as far as possible.

Here, during the conditioning, the transfer pins can be inserted, in order to seal off the inner space and place it under pressure, so that an optimum contacting of the sleeve wall and hence conditioning and shaping is ensured.

According to a first aspect of the present invention, it is now already possible to carry out an inflation process in the removal gripper itself, and in so doing for example to blow out the base of the preform, in particular in its axial extent. In this case, the cavity in the removal sleeves of the removal gripper would have to be constructed in a correspondingly enlarged manner in the base region. The radial outer circumference of the preform would thereby not alter substantially, which would also not be readily possible, because otherwise the preform could not be reliably guided out from the injection mould. With this procedure, it is possible to form preform bases as are indicated for example in WO 2008/041186 A2 and which are advantageous for the subsequent stretch blow moulding. With a so-called "Capelio Design", preforms can be formed with a thinner preform base, inter glia with the advantage of a saving on material and a possibility for quicker cooling. This is of interest in particular when the production of such contours by injection moulding has disadvantages.

After this conditioning, which can take place more quickly than the cooling hitherto, in particular when only or also in the post-cooling device an inflation process takes place, because then the preforms do not compulsorily have to be led to such a low temperature level, the preforms are removed from the removal sleeve with the transfer gripper and are transferred into the post-cooling device. The cavities of the post-cooling device (which can also be designated as a blow moulding device) are enlarged here in comparison with the preform produced in the injection mould such that in particular the radial extent of the inner space is greater in the inflated preform than the radial extent of the inner space in the neck region of the preform. Of course, an axial widening can also take place. Thereby, a widened shoulder region is produced, which would constitute an undercut in an injection mould and could not be readily demoulded.

By continuous or renewed sealing of the preform inner space with the transfer gripper and corresponding application of pressure of the preform inner space with a fluid (for example air), the preform which was previously conditioned with regard to temperature in the removal gripper is now inflated in the region of the preform body and places itself against the wall of the injection moulding cavities of the post-cooling device. This inflation is, however, only a "pre-inflation" in the sense of the finished plastic product which is subsequently to be produced, and is therefore also designated hereinbelow as "preblowing", because only an intermediate product for a finished plastic bottle or a finished plastic container is produced. For the production of a finished plastic bottle or of a finished plastic container, a further blow moulding step is required.

In the ways indicated above, preforms can be produced with an undercut geometry, in which the diameter of the preform body is greater than its neck region, its shoulder region therefore enlarges outwards, and/or is produced with a Capello design. In so doing, either in the removal sleeve or in the post-cooling device or in both devices, a blow moulding process can be carried out.

Such a preform offers a multitude of advantages. By the inflating of the preform, the preform body as a whole enlarges, whereby in a subsequent blow moulding step more infrared light of a blow moulding machine can be absorbed, with which the preform is heated up again for blow moulding. This leads to significant energy savings and lower investment costs in the blow moulding machine or in operation. Furthermore, through the inflating of the preform, the wall thickness becomes smaller, as can be seen in FIGS. 1-3. The originally produced preform has a thicker wall thickness 1, whereas the preform geometries with undercut have thinner wall thicknesses 2 and 3. Thereby, the preform can be brought more quickly and more accurately to the optimum stretch blow temperature than is possible hitherto. Here also, an additional energy saving and lower investment costs can be anticipated in the blow moulding machine. In addition, depending on the preform geometry, if applicable savings can be made with regard to plastic material.

In addition, it is possible to provide the preform in the post-cooling device with a surface structure whereby the entire surface of the preform is greatly enlarged on its outer side so that, in turn, more energy can be absorbed. This would further intensify the two above-mentioned effects. The surface structure would then become lost again in the stretching process of the subsequent blow moulding.

However, the preform geometry offers not only advantages for the subsequent blow moulding process; it also has advantages for its own production process. Owing to the thinner wall of the preforms in the cooled blow moulding- or respectively post-cooling devices, the cooling time as a whole can also be reduced here, which contributes to shorter cycle times. This advantageously also leads to the fact that the risk of crystallization is distinctly reduced in comparison with preforms with thick wall thicknesses. Also, owing to the conditioning, instead of the intensive cooling hitherto, the dwell time in the removal gripper can be reduced.

The post-cooling device, acting as blow moulding device, should preferably be water-cooled in this way. The more aggressive this cooling is, the better. Corresponding to the aggressivity of the cooling, the cycle time and also the risk of crystallization of the preforms is reduced.

In the removal gripper, on the other hand, the preform should preferably be conditioned to a temperature which is favourable for a subsequent blow moulding process. Such a temperature range lies for example between 90 and 150° C. This is of course only necessary when a subsequent blow moulding process takes place. Without such a blow moulding process in the post-cooling device, cooling can also be carried out very aggressively again.

A significant shaping of the neck region of the preform is not intended in any of these steps. In order to avoid such a shaping for example during the sealing or positive pressure stage, the preform is preferably supported from the exterior at least during the formation of the positive pressure in the neck region or at least in parts of the neck region. This support device can be constructed in the form of a jaw device having two or more parts and being able to be opened and closed, arranged respectively in the region of each transfer pin of the transfer gripper.

The jaw devices are preferably constructed so that they can be combined and/or coupled with the post-cooling device, serving as blow moulding device, such that, the inflated preform is supported completely into its neck region during the inflation step. According to an advantageous embodiment of the invention, the jaw devices can likewise be cooled, in particular water-cooled.

The conditioning is then further supported or respectively accelerated in particular when also during the receiving of the preform in a removal sleeve its inner space is at least temporarily placed under pressure (even if no blow moulding takes place in the removal sleeve). Such a positive pressure can be kept in the range of 0.5-8 bar.

As the removal from the removal device or respectively the removal gripper can take place very quickly—and namely owing to the now pending conditioning of the preforms to for example 120° and the greater extending of the preforms with regard to dimensions, instead of the cooling hitherto—it can be necessary to provide two or more post-cooling devices, into which the preforms can be transferred alternately from the removal gripper. The post-cooling devices can also be configured so that they receive double, triple or a multiple of the batch of a preform batch produced in the injection mould.

As a whole, with the device according to the invention preforms with an undercut can be produced in a quick cycle time, wherein this geometry subsequently also has advantages in the further processing in a blow moulding machine. Thus, multiple increases in efficiency are produced, both in the actual production process of the preform and also in the subsequent processing step.

BRIEF DESCRIPTION OF THE DRAWINGS

The invention is explained in further detail below and with reference to the enclosed drawings. The drawings show in FIG. 1 a cross-sectional view of a preform with a conventional geometry, as is produced with an injection mould, FIG. 2 a cross-sectional view of a preform with a geometry with undercut, FIG. 3 a cross-sectional view of a preform with a further geometry with undercut and altered base geometry, FIG. 4 a sectional illustration of a preform received in a removal sleeve of a removal gripper with introduced transfer pin, FIG. 5 a sectional illustration of a preform transferred into the cavity of a post-cooling device, not yet inflated, with introduced transfer pin, FIG. 6 a sectional illustration of a preform now inflated in the post-cooling device, with undercut in the shoulder region, FIG. 7 a diagrammatic illustration with sectional drawings of removal- and blow moulding device, by which the general mode of operation of the device is described, and FIG. 8 a view of a preform with a Capello design in the base.

DESCRIPTION OF THE PREFERRED EMBODIMENTS

The procedure in the production of a preform with an undercut preform geometry is to be explained with the aid of the drawings. Here, "undercut" means that a preform widens radially in the region of its shoulder part, so that the undercut occurs with respect to the cavity shape of the injection mould.

Figure 3:
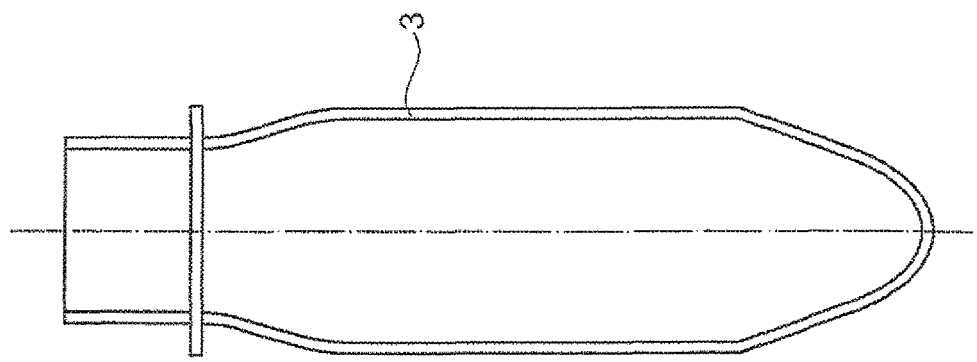
Figure 2:
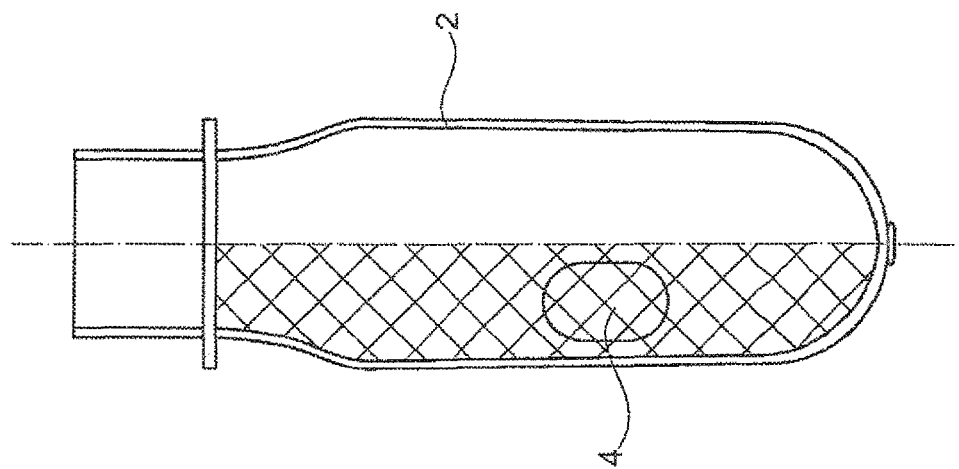
Figure 1:
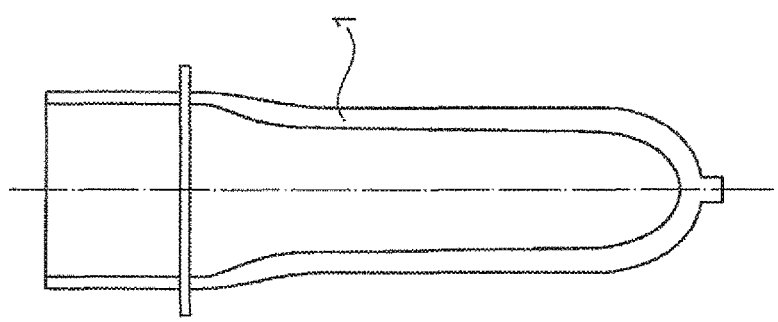

Two such undercut geometries are illustrated in FIGS. 2 and 3, wherein FIG. 3 also shows an alteration to the base contour. Here, not only is the external dimension or respectively the external diameter of the preform in the preform body region greater than in the neck region, but in particular the radial diameter of the inner space diameter in the preform body is greater than the radial inner space in the neck region. This geometry can not be readily produced in an injection mould. At least one core would have to be used, which could be contracted radially in the region of the preform body.

In order to nevertheless be able to produce a preform as shown in FIGS. 2 and 3 with the conventional injection moulding technology, the preform is firstly produced in a conventional manner in an injection mould and after the first cooling and the opening of the mould is removed in a conventional manner with a removal gripper. The removal gripper has a plurality of removal sleeves here, in which the preform is introduced mostly up to the neck region.

Both the injection moulding machines with injection mould and also the removal devices are sufficiently known from the prior art.

In FIG. 4 only a single removal sleeve 12 of a plurality of removal sleeves of such a known removal device 10 is illustrated, in order to be able to show the holding of the preform 14 which was produced in the previous step in the injection mould. The initially produced preform 14 has a conventional shape with a relatively thick wall thickness and is almost completely received in its body region in the sleeve, which (not illustrated in further detail here) is water-cooled. This cooling, whether by air or water, does not have to be entered into in further detail here, because it is likewise known in diverse variant embodiments from the prior art.

The front end of a transfer pin of a transfer gripper 16 is inserted into the preform illustrated in FIG. 4, wherein the transfer gripper 16 has a number of transfer pins 18 corresponding to the number of removal sleeves 12. At the front end of the transfer pin, an elastic sealing device is provided, which can alter (widen) in its radial dimension by compression. In particular, a shaft (not illustrated) of the transfer pin is pushed forward, in order to compress the elastic cuff and press it radially outwards, whereby it deposits itself against the inner wall of the preform and one the one hand seals the inner space of the preform with respect to the external environment, and on the other hand holds it. This depositing takes place in particular in the region of the neck ring, where a particular stability is provided.

In this example embodiment, from the front end of the transfer pin 18 a stretching rod 24 extends into the dome-shaped, closed region of the preform. Via this stretching rod 24 air can be supplied under pressure to the inner space of the preform. According to a particular embodiment, the stretching rod can also itself be constructed as a type of die and can shape the base region of the preform by the application of a die-like pressure. Of course, both variants—die and air pressure—can also be combined.

Through the build-up of a positive pressure in the range of 0.5-8 bar, the preform is pressed with its outer walls against the inner wall of the removal sleeve 12, acting as cooling sleeve, so that a particularly good tempering and recalibrating takes place.

If the cavity of the removal gripper is configured accordingly, in this position the base region can already be blown out, as long as in so doing no undercuts occur and the preform is held in a secure contour. Thereby, inter alia, preform contours with a so-called Capello design can be produced, as is illustrated in FIG. 8.

Moreover, on each transfer pin 18 of the transfer gripper 16 here two-part jaws 22 are arranged, wherein the two jaw elements can be moved radially apart and towards each other. The assembly and device necessary for the movement of the jaws is not illustrated in the figures. In FIG. 4 the two jaw elements are moved radially outwards. When these jaw elements are moved radially inwards, they surround the neck region of the preform (or at least parts thereof) in a form-fitting manner, as can be further illustrated subsequently with the aid of FIG. 5.

The removal device 10 with the removal sleeves 12 therefore serves not only for the removal of the preforms from the injection mould, but also for the preconditioning to a particular temperature, for example 120°. In this temperature range, the risk of crystallization is already significantly reduced, but a plasticity of the preform is still maintained, under which the preform can be shaped. As the conditioning takes place to a temperature range of for example 120° C.—and not to a lower temperature—, a shorter dwell time is possible in the removal gripper than hitherto, which as a whole can contribute to a shortening of the cycle time. This preconditioning also constitutes a difference in comparison with the working- and process steps known hitherto of the best possible cooling.

It is to be noted here that for the case of inflating the preforms only in the removal sleeves and not also later in the post-cooling device, a conventionally intensive cooling can take place completely in the removal grippers, instead of a conditioning.

After reaching the conditioning temperature, the preform 14 is removed from the removal sleeve 12 by means of the transfer pin 18 and, as illustrated in FIG. 7, is introduced into a post-cooling device (cooling block) 26 by swivelling. The status after the immediate introduction of the preform 14 into the cavity of the post-cooling device 26, serving as blow moulding device, is illustrated in FIG. 5. Here, the two jaws 22 of the respective jaw device of a transfer pin 18 are already closed, in order to be able to receive the forces of the blowing, and substantially completely surround the neck region and the neck ring in the region in which no shaping is to take place. In the region in which the neck region is surrounded by the jaws 22, the preform is supported from the exterior and can not alter in its dimension. Moreover, the jaw device can couple with the blow moulding device 26, so that except for the above opening in the jaw device a completely closed-off cavity is produced. The jaws are water-cooled here (not illustrated), in order to thus ensure as quick a removal of heat as possible from the preform region with a thick wall thickness.

The preform, which is still warm and deformable, is now inflated by renewed introduction of air with a corresponding air pressure of 0.5-8 bar, so that the preform wall expands and places itself against the inner side of the post-cooling device constructed in a larger form. The result can be seen in FIG. 6, wherein it can be seen moreover that the preform wall of the preform 28 has now considerably reduced.

As the post-cooling device is cooled in a correspondingly aggressive manner (for example via water cooling—not illustrated), the preform 28 can be brought very quickly to a temperature which is desired and acceptable for the subsequent packing, because now a very much thinner wall thickness is present. After a sufficient cooling, the inflated and pre-blown preform 28 is removed from the post-cooling device, wherein it can be seen in FIG. 6 that this removal is without problems in the shoulder region, because the jaws 22 cover the undercut and can be opened by the division into two. Owing to the smaller wall thickness, less risk of reheating of the preform 28 also exists after the removal from the cooled region.

After the opening of the jaw elements and the relaxing of the elastic gripping- and sealing device 20, the transfer pin 18 can be drawn out from the preform 28, wherein the preform 28 itself still remains in the post-cooling device and is further cooled there. After a sufficient cooling process, the preform 28 can then be moved over a conveyor belt and, by a corresponding air impulse via air ducts which are not illustrated, can be ejected onto a conveyor belt.

As illustrated in FIG. 2, with a corresponding construction of the cavity walls, either in the removal sleeve or in the post-cooling device, structures can also be introduced into the outer surface of the preform 2 on inflating.

As the pre-inflated preforms 28 are now greater in their dimension than the original preforms, the same number of preforms 28 as hitherto can no longer be received in the post-cooling device which is constructed as a blowing device. For this reason, with a corresponding efficiency of the machine, it can be necessary to arrange two identical post-cooling devices 26, for example above laterally to the machine, and to transfer the preform batches originating from the removal device alternately into one or the other post-cooling device. This is illustrated diagrammatically in FIG. 7, wherein only one removal sleeve 12 is illustrated, from which the preform batches are swivelled alternately into the blow mould towards the right and into the only basic post-cooling device toward the left (only indicated). In the respective position, the transfer pin (then reference numbers

18', 18")—here without stretching pin—is then also swivelled. Of course, it is also advantageous if each post-cooling device 26 can receive two or more batches of preforms. For this, however, the arrangement of the impressions must be coordinated accordingly both in the mould and also in the removal gripper and in the transfer gripper.

With the present invention, it is possible in a simple manner to generate preforms with special geometries, for example with an undercut in the shoulder region or with a Capello design, which have several advantages both in their own production and also in the subsequent inflation process.

What is claimed is:

1. A method for producing a preform, comprising:
   injecting a polymer melt into an injection mould having a cavity shaped to mold a preform formed with a neck region and defined by an inner space having in a preform body region a radial extent which is not greater than a radial extent of the inner space in the neck region adjacent the preform body region;
   opening the injection mould after a first cooling step;
   removing the preform from the open mould with a removal gripper; and
   inflating the preform relative to the cavity of the injection mould with use of a positive pressure so that the preform increases relative to the cavity of the injection mould and a wall of the inflated preform is urged against a wall of a cavity of the removal gripper, said cavity of the removal gripper sized greater in a base region of the preform than the cavity of the injection mould,
   wherein said inflating step includes inflating the base region of the preform in the removal gripper with the positive pressure in a range between 0.5 and 8 bar.

2. The method of claim 1, wherein a radial outer circumference of the preform is kept constant.

3. The method of claim 1, further comprising tempering a removal sleeve of the removal gripper.

4. The method of claim 3, wherein the tempering in the removal gripper provides conditioning of the preform.

5. A method for producing a preform, comprising:
   injecting a polymer melt into an injection mould having a cavity shaped to mold a preform formed with a neck region and defined by an inner space having in a preform body region a radial extent which is not greater than a radial extent of the inner space in the neck region adjacent the preform body region;
   opening the injection mould after a first cooling step;
   removing the preform from the open mould with a removal gripper;
   inflating the preform relative to the cavity of the injection mould with use of a positive pressure so that the preform increases relative to the cavity of the injection mould and a wall of the inflated preform is urged against a wall of a cavity of the removal gripper, said cavity of the removal gripper sized greater in a base region of the preform than the cavity of the injection mould, and
   tempering a removal sleeve of the removal gripper to condition the preform at a temperature range between 90° and 150° C.

6. The method of claim 5, wherein said inflating step including inflating the base region of the preform in the removal gripper with the positive pressure.

7. The method of claim 6, wherein: the positive pressure is between 0.5 and 8 bar.

8. The method of claim 5, wherein the tempering step in the removal gripper provides cooling.

9. The method of claim 1, further comprising supporting the neck region of the preform from outside, when applying the positive pressure during receiving of the preform in the removal gripper.

10. The method of claim 9, further comprising placing a removal sleeve of the removal gripper immediately adjacent to the support of the preform in the neck region to realize a complete circumferential support of the preform.

11. The method of claim 1, further comprising providing a post cooling of the preform after the inflating of the preform.

12. The method of claim 5, wherein a radial outer circumference of the preform is kept constant.

13. The method of claim 3, wherein the tempering step in the removal gripper provides cooling.

14. The method of claim 5, further comprising supporting the neck region of the preform from outside, when applying the positive pressure during receiving of the preform in the removal gripper.

15. The method of claim 14, further comprising placing a removal sleeve of the removal gripper immediately adjacent to the support of the preform in the neck region to realize a complete circumferential support of the preform.

16. The method of claim 5, further comprising providing a post cooling of the preform after the inflating of the preform.

* * * * *